US006925754B1

(12) United States Patent
Tearoe

(10) Patent No.: US 6,925,754 B1
(45) Date of Patent: Aug. 9, 2005

(54) VEGETATION SUPPORT

(76) Inventor: Brian J. Tearoe, 3567 Turner Street, Vancouver, BC (CA) V5K 2J1

( * ) Notice: Subject to any disclaimer, the term of this patent is extended or adjusted under 35 U.S.C. 154(b) by 36 days.

(21) Appl. No.: 10/671,240

(22) Filed: Sep. 25, 2003

(51) Int. Cl.[7] ................. A01G 17/06; F16M 13/00; A01K 97/10
(52) U.S. Cl. ................. 47/47; 47/44; 47/39; 47/82; 47/83; 52/157; 52/165; 248/27.8; 248/156; 248/530; 248/532; 173/145; 172/371
(58) Field of Search ................. 52/157, 165; 248/530, 248/532, 156, 27.8; 47/47, 44, 83, 82, 39; 175/162; 173/145; 172/371, 381, 37, 41; 111/49, 92

(56) References Cited

U.S. PATENT DOCUMENTS

| | | | |
|---|---|---|---|
| 23,741 A * | 4/1859 | Neelin ................. 92/169.1 |
| 670,144 A * | 3/1901 | Bond ................. 248/125.3 |
| 728,603 A * | 5/1903 | Pitcher ................. 52/153 |
| 836,321 A * | 11/1906 | Hill ................. 248/125.3 |
| 1,902,663 A * | 3/1933 | Phillips ................. 47/47 |
| 2,441,109 A * | 5/1948 | Carlson ................. 403/86 |
| 2,990,647 A * | 7/1961 | Himebaugh ................. 47/47 |
| 3,204,779 A * | 9/1965 | Warner ................. 211/190 |
| 3,318,560 A * | 5/1967 | Garrette, Jr. et al. ....... 248/545 |
| 4,026,068 A | 5/1977 | Tepper |
| 4,213,272 A | 7/1980 | Nievelt |
| 4,620,389 A | 11/1986 | Coulson |
| 4,703,584 A | 11/1987 | Chazalnoel |
| 4,738,062 A * | 4/1988 | Dickey ................. 52/157 |
| 4,829,707 A | 5/1989 | Koffler et al. |
| 4,887,385 A * | 12/1989 | James et al. ................. 47/41.12 |
| D318,442 S | 7/1991 | Cheek |
| 5,098,057 A * | 3/1992 | Gran et al. ................. 248/530 |
| 5,735,494 A * | 4/1998 | Kurk ................. 248/97 |
| 6,386,491 B1 * | 5/2002 | Bissett ................. 248/121 |
| 6,487,977 B1 * | 12/2002 | Williams et al. ......... 108/50.12 |
| 6,604,320 B1 * | 8/2003 | Hsia ................. 47/47 |
| 6,702,239 B2 * | 3/2004 | Boucher ................. 248/156 |

FOREIGN PATENT DOCUMENTS

| FR | 2624896 | * | 6/1989 | ............ E02D 5/56 |
| GB | 2187770 | * | 9/1987 | ............ E04C 3/00 |

* cited by examiner

Primary Examiner—Peter M. Poon
Assistant Examiner—Andrea M. Valenti

(57) ABSTRACT

A new vegetation support for supporting the growth of vegetation such as vegetable plants and vines. The inventive device includes an elongate pole with alternating first and second sets of bores through it. The bores of the first set of bores are extended in a first direction while the bores of the second set of bores are extended in a second direction. Inserted through each of the bores is an elongate dowel. An auger member with a top turning portion and a bottom corkscrew portion is inserted into an opening in the bottom of the pole.

19 Claims, 2 Drawing Sheets

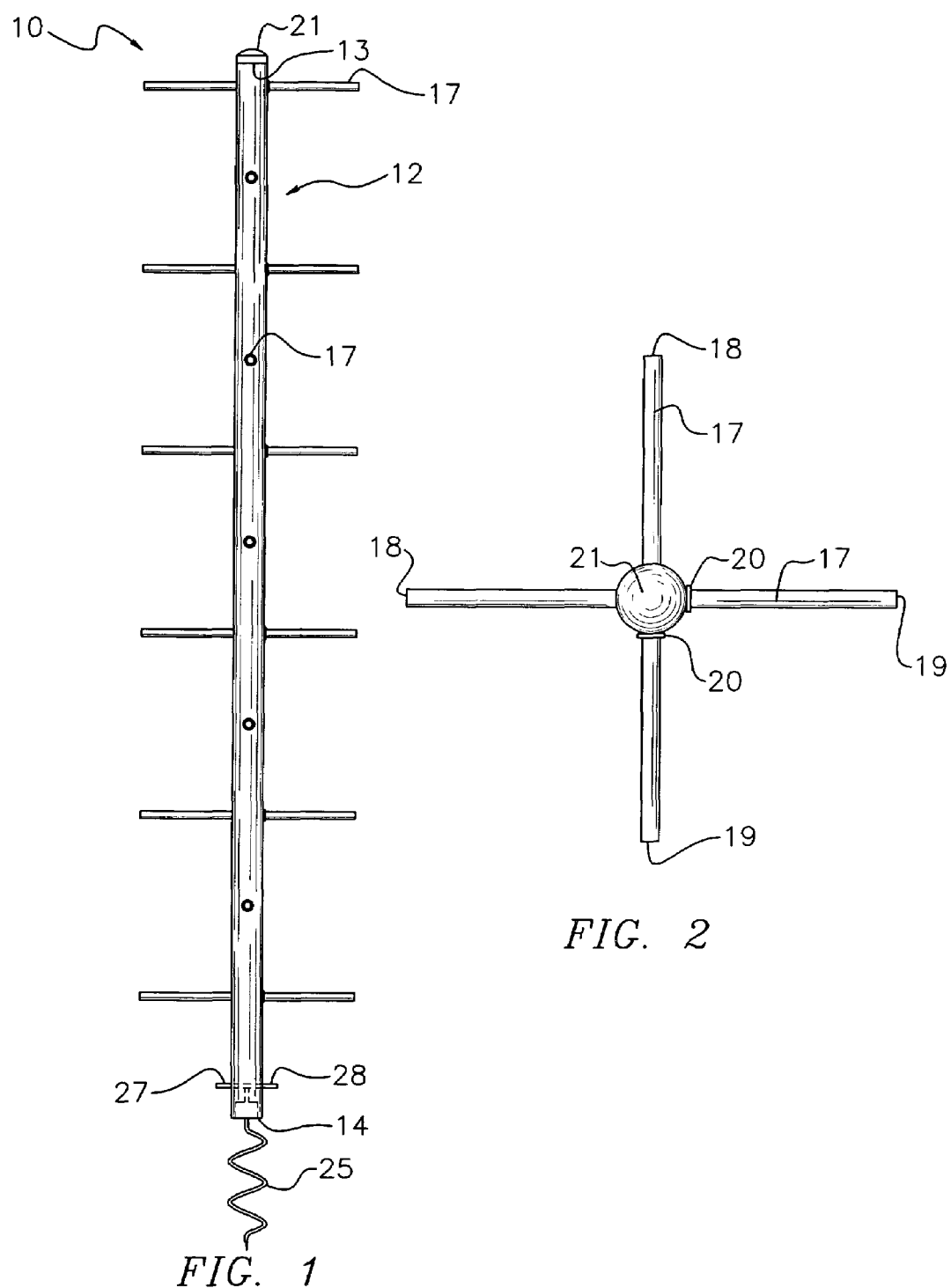

VEGETATION SUPPORT

BACKGROUND OF THE INVENTION

1. Field of the Invention

The present invention relates to support devices for vegetation and more particularly pertains to a new vegetation support for supporting the growth of vegetation such as vegetable plants and vines.

2. Description of the Prior Art

The use of support devices for vegetation is known in the prior art. More specifically, support devices for vegetation heretofore devised and utilized are known to consist basically of familiar, expected and obvious structural configurations, notwithstanding the myriad of designs encompassed by the crowded prior art which have been developed for the fulfillment of countless objectives and requirements.

Known prior art support devices for vegetation include U.S. Pat. No. 4,829,707; U.S. Pat. No. 4,213,272; U.S. Pat. No. 4,703,584; U.S. Pat. No. 4,026,068; U.S. Pat. No. 4,620,389; and U.S. Patent No. Des. 318,442.

While these devices fulfill their respective, particular objectives and requirements, the aforementioned patents do not disclose a new vegetation support. The inventive device includes an elongate pole with alternating first and second sets of bores through it. The bores of the first set of bores are extended in a first direction while the bores of the second set of bores are extended in a second direction. Inserted through each of the bores is an elongate dowel. An auger member with a top turning portion and a bottom corkscrew portion is inserted into an opening in the bottom of the pole.

In these respects, the vegetation support according to the present invention substantially departs from the conventional concepts and designs of the prior art, and in so doing provides an apparatus primarily developed for the purpose of supporting the growth of vegetation such as vegetable plants and vines.

SUMMARY OF THE INVENTION

In view of the foregoing disadvantages inherent in the known types of support devices for vegetation now present in the prior art, the present invention provides a new vegetation support construction wherein the same can be utilized for supporting the growth of vegetation such as vegetable plants and vines.

The general purpose of the present invention, which will be described subsequently in greater detail, is to provide a new vegetation support apparatus and method which has many of the advantages of the support devices for vegetation mentioned heretofore and many novel features that result in a new vegetation support which is not anticipated, rendered obvious, suggested, or even implied by any of the prior art support devices for vegetation, either alone or in any combination thereof.

To attain this, the present invention generally comprises an elongate pole with alternating first and second sets of bores through it. The bores of the first set of bores are extended in a first direction while the bores of the second set of bores are extended in a second direction. Inserted through each of the bores is an elongate dowel. An auger member with a top turning portion and a bottom corkscrew portion is inserted into an opening in the bottom of the pole.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vegetation support apparatus and method which has many of the advantages of the support devices for vegetation mentioned heretofore and many novel features that result in a new vegetation support which is not anticipated, rendered obvious, suggested, or even implied by any of the prior art support devices for vegetation, either alone or in any combination thereof.

It is another object of the present invention to provide a new vegetation support which may be easily and efficiently manufactured and marketed.

It is a further object of the present invention to provide a new vegetation support which is of a durable and reliable construction.

An even further object of the present invention is to provide a new vegetation support which is susceptible of a low cost of manufacture with regard to both materials and labor, and which accordingly is then susceptible of low prices of sale to the consuming public, thereby making such vegetation support economically available to the buying public.

Still yet another object of the present invention is to provide a new vegetation support which provides in the apparatuses and methods of the prior art some of the advantages thereof, while simultaneously overcoming some of the disadvantages normally associated therewith.

Still another object of the present invention is to provide a new vegetation support for supporting the growth of vegetation such as vegetable plants and vines.

Yet another object of the present invention is to provide a new vegetation support which includes an elongate pole with alternating first and second sets of bores through it. The bores of the first set of bores are extended in a first direction while the bores of the second set of bores are extended in a second direction. Inserted through each of the bores is an elongate dowel. An auger member with a top turning portion and a bottom corkscrew portion is inserted into an opening in the bottom of the pole.

Still yet another object of the present invention is to provide a new vegetation support that is easy to install into a ground surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new vegetation support according to the present invention.

FIG. 2 is a schematic top view of the present invention.

DESCRIPTION OF THE PREFERRED EMBODIMENT

Figure 3:
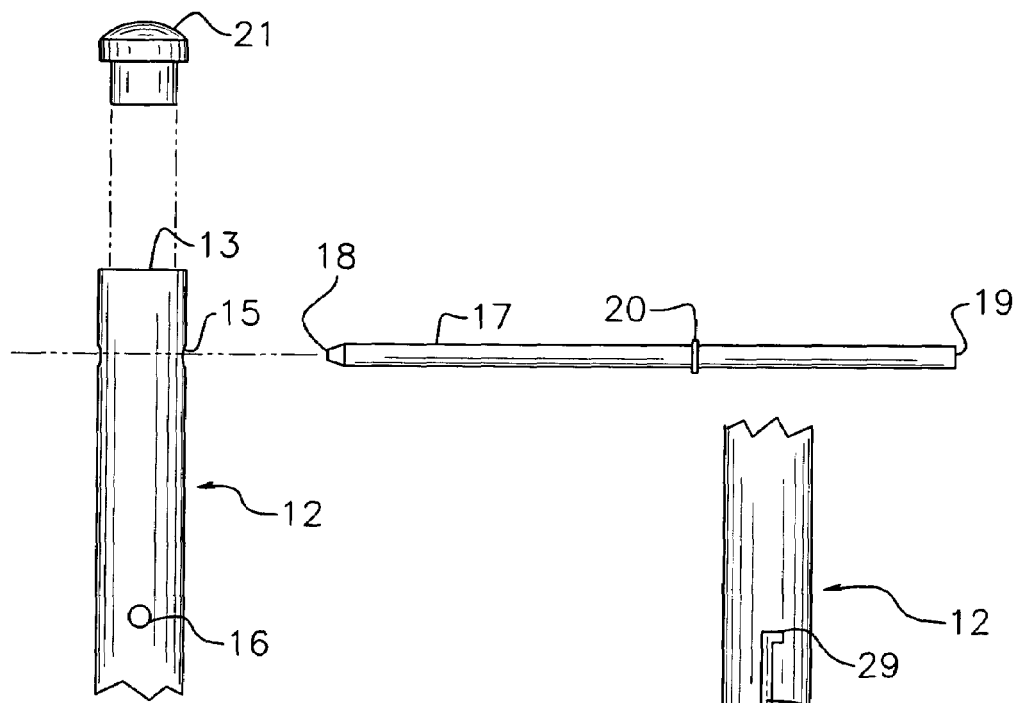
FIG. 3 is a schematic exploded side view of the top end of the present invention.
Figure 4:
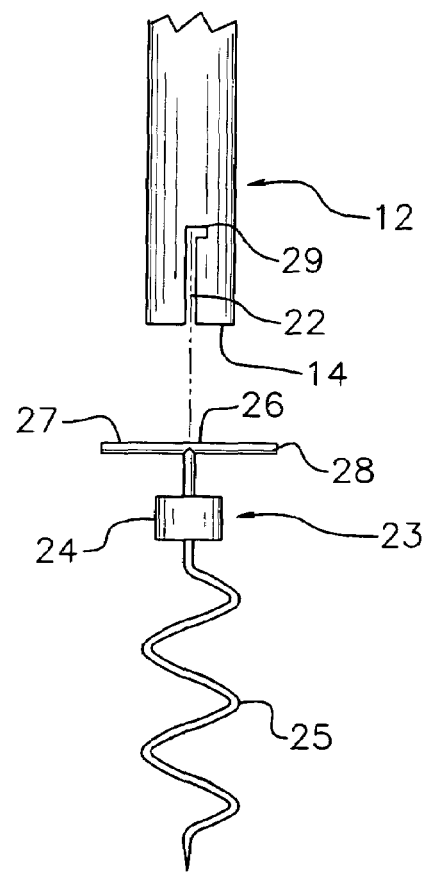
FIG. 4 is a schematic exploded side view of the bottom end of the present invention.

With reference now to the drawings, and in particular to FIGS. 1 through 4 thereof, a new vegetation support embodying the principles and concepts of the present invention and generally designated by the reference numeral 10 will be described.

As best illustrated in FIGS. 1 through 4, the vegetation support 10 generally comprises an elongate pole 12 with alternating first and second sets of bores 15, 16 through it. The bores of the first set of bores 15 are extended in a first direction while the bores of the second set of bores 16 are extended in a second direction. Inserted through each of the bores is an elongate dowel 17. An auger member 23 with a top turning portion 24 and a bottom corkscrew portion 25 is inserted into an opening in the bottom end 14 of the pole 12.

In closer detail, the elongate pole 12 is preferably generally cylindrical and tubular. The pole 12 has an interior, and top and bottom ends 13, 14 with the longitudinal axis of the pole extending between the top and bottom ends 13, 14. The top end 13 has an opening into the interior of the pole 12 while the bottom end 14 also has an opening into the interior of the pole 12. The pole 12 has alternating first and second sets of bores 15, 16 therethrough. The lengths of the bores are extended substantially perpendicular to the longitudinal axis of the pole 12 with the lengths of the bores of the first set of bores 15 extending in a direction substantially perpendicular to the lengths of the bores of the second set of bores 16. Preferably, the bores of the first set of bores 15 is generally equidistantly spaced apart from one another the adjacent bores of the first set of bores 15 and the bores of the second set of bores 16 are generally equidistantly spaced apart from one another the adjacent bores of the second set of bores 16.

In an illustrative ideal embodiment, the pole 12 has a length defined between the top and bottom ends of less than about 6 feet and has a diameter of less than about 2 inches. In this ideal illustrative embodiment, adjacent bores of the first set of bores 15 are spaced apart less than about 12 inches from each other and adjacent bores of the second set of bores 16 are also spaced apart less than about 12 inches from each other. Preferably, each bore of the first set of bores 15 is spaced apart from adjacent bores of the second set of bores 16 less than about 6 inches.

The support 10 also includes a plurality of elongate dowels 17. Each dowel 17 is generally cylindrical and has opposite first and second ends 18, 19 and a length defined between the first and second ends. Preferably, the first end 18 of each of the dowels 17 is tapered to aid insertion of the dowel 17 into a bore of the pole 12. Each of the dowels 17 has an annular stop 20 therearound, the annular stop 20 is positioned between the first and second ends 18, 19 of the dowel 17. Ideally, the annular stop 20 is positioned three-fourths of the length of the dowel 17 from the first end 18 of the dowel 17. In the ideal illustrative embodiment, the length of each of the dowels 17 is less than about 14 inches while the diameter of each dowel is less than about ⅜ inch. In this illustrative embodiment, the annular stop 20 is positioned 8 inches from the first end 18 of the dowel 17 and 6 inches from the second end 19 of the dowel 17. Each of the dowels 17 is inserted through an associated bore of the pole 12 such that the annular stops 20 of the dowels 17 abut the pole 12 so that the ends of the dowel extend from either end of the associated bore of the pole 12. This permits the dowels 17 to support vegetation thereon during use.

Preferably, a cap 21 is inserted to frictionally fit into the opening of the top end 13 of the pole 12 such that the cap 21 substantially covers the opening of the top end 13 of the pole 12. The bottom end 14 of the pole 12 has a pair of diametrically opposed elongate slots 22 with the lengths of the slots 22 extending from the bottom end 14 of the pole 12 towards the top end 13 of the pole 12 and substantially parallel to the longitudinal axis of the pole 12. Each of the slots 22 has a locking notch 29 distal the bottom end 14 of the pole 12.

The auger member 23 has a top turning portion 24 and a helical bottom corkscrew portion 25. The corkscrew portion 25 is designed for insertion into a ground surface. The turning portion 24 of the auger member 23 has a generally T-shaped handle 26 a pair of arms 27, 28. In the ideal illustrative embodiment, the corkscrew portion 25 has a length of less than about 12 inches. The turning portion 24 of the auger member 23 is inserted into the opening of the bottom of the pole 12. Each of the arms 27, 28 of the handle 26 of the turning portion 24 of the auger member 23 is inserted into an associated slot of the bottom end 14 of the pole 12 such that each of the arms 27, 28 of the handle 26 may be inserted into the locking notch 29 of the associated slot of the bottom end 14 of the pole 12 to help hold the handle 26 of the auger member 23 to the bottom end 14 of the pole 12. Optionally, the turning portion 24 of the auger member 23 is threaded with the opening of the bottom end 14 of the pole 12 also threaded. In this optional embodiment, the turning portion 24 of the auger member 23 is threadedly inserted into the opening of the bottom end 14 of the pole 12 to hold the auger member to the bottom end of the pole.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vegetation support, comprising:

an elongate pole having an interior, and top and bottom ends, said pole having a longitudinal axis extending between said top and bottom ends, said bottom having an opening into the interior of said pole;

said pole having alternating first and second sets of bores therethrough, said bores of said first set of bores being extended in a first direction, said bores of said second set of bores being extended in a second direction;

a plurality of elongate dowels, each dowel having opposite first and second ends, and a length defined between said first and second ends of said dowel;

each of said dowels being inserted through an associated bore of said pole;

said bottom end of said pole having a pair of elongate slots;

an auger member having a top turning portion and a bottom corkscrew portion, said corkscrew portion being for insertion into a ground surface, said turning portion of said auger member having a generally T-shaped handle, said handle of said turning portion of said auger member having a pair of arms; and said turning portion of said auger member being inserted into said opening of said bottom of said pole, each of said arms of said handle of said turning portion of said auger member being inserted into an associated slot of said bottom end of said pole;

wherein each of said slots has a locking notch, wherein each of said arms of said handle of said turning portion of said auger member is inserted into an associated slot of said bottom end of said pole such that each of said arms of said handle may be inserted into the locking notch of the associated slot of said bottom end of said pole to help hold said handle of said auger member to said bottom end of said pole.

2. The vegetation support of claim 1, wherein said top has an opening into the interior of said pole, wherein a cap is inserted into said opening of said top end of said pole such that said cap substantially covers said opening of said top end of said pole.

3. The vegetation support of claim 1, wherein said bores are extended substantially perpendicular to said longitudinal axis of said pole, and wherein said bores of said first set of bores are extended substantially perpendicular to said bores of said second set of bores.

4. The vegetation support of claim 1, wherein said bores of said first set of bores are generally equidistantly spaced apart from the adjacent bores of said first set of bores.

5. The vegetation support of claim 1, wherein said bores of said second set of bores are generally equidistantly spaced apart from the adjacent bores of said second set of bores.

6. The vegetation support of claim 1, wherein said pole has a length defined between said top and bottom ends of said pole of less than about 6 feet, wherein said pole has a diameter of less than about 2 inches, wherein adjacent bores of said first set of bores are spaced apart less than about 12 inches from each other, wherein adjacent bores of said second set of bores are spaced apart less than about 12 inches from each other, and wherein each bore of said first set of bores is spaced apart from adjacent bores of said second set of bores less than about 6 inches.

7. The vegetation support of claim 1, wherein said length of each of said dowels is less than about 14 inches.

8. The vegetation support of claim 1, wherein said first end of each of said dowels is tapered.

9. The vegetation support of claim 1, wherein each of said dowels has an annular stop therearound, said annular stop being positioned between said first and second ends of said dowel, wherein each of said dowels is inserted through an associated bore of said pole such that said annular stops of said dowels abut said pole.

10. A vegetation support, comprising:

an elongate pole being generally cylindrical and having an interior, and top and bottom ends, said pole having a longitudinal axis extending between said top and bottom ends, said top having an opening into the interior of said pole, said bottom having an opening into the interior of said pole;

said pole having alternating first and second sets of bores therethrough, said bores being extended substantially perpendicular to said longitudinal axis of said pole, said bores of said first set of bores being extended substantially perpendicular to said bores of said second set of bores;

said bores of said first set of bores being generally equidistantly spaced apart from the adjacent bores of said first set of bores;

said bores of said second set of bores being generally equidistantly spaced apart from the adjacent bores of said second set of bores;

wherein said pole has a length defined between said top and bottom ends of said pole of less than about 6 feet;

wherein said pole has a diameter of less than about 2 inches;

wherein adjacent bores of said first set of bores are spaced apart less than about 12 inches from each other, wherein adjacent bores of said second set of bores are spaced apart less than about 12 inches from each other, wherein each bore of said first set of bores is spaced apart from adjacent bores of said second set of bores less than about 6 inches;

a plurality of elongate dowels, each dowel being generally cylindrical and having opposite first and second ends, and a length defined between said first and second ends of said dowel, wherein said length of each of said dowels is less than about 14 inches, each of said dowels having a diameter of less than about 3/8 inch, said first end of each of said dowels being tapered;

each of said dowels having an annular stop therearound, said annular stop being positioned between said first and second ends of said dowel, said annular stop being positioned three-fourths of the length of said dowel from said first end of said dowel;

each of said dowels being inserted through an associated bore of said pole such that said annular stops of said dowels abut said pole;

a cap being inserted into said opening of said top end of said pole such that said cap substantially covers said opening of said top end of said pole;

said bottom end of said pole having a pair of diametrically opposed elongate slots, the lengths of said slots extending from said bottom end of said pole towards said top end of said pole substantially parallel to said longitudinal axis of said pole, each of said slots having a locking notch;

an auger member having a top turning portion and a bottom generally helical corkscrew portion, said corkscrew portion being for insertion into a ground surface, said turning portion of said auger member having a generally T-shaped handle, said handle of said turning portion of said auger member having a pair of arms; and said turning portion of said auger member being inserted into said opening of said bottom of said pole, each of said arms of said handle of said turning portion of said auger member being inserted into an associated slot of said bottom end of said pole such that each of said arms of said handle may be inserted into the locking notch of the associated slot of said bottom end of said pole to help hold said handle of said auger member to said bottom end of said pole.

11. A vegetation support, comprising:

an elongate pole having an interior, and top and bottom ends, said pole having a longitudinal axis extending between said top and bottom ends, said bottom having an opening into the interior of said pole;

said pole having alternating first and second sets of bores therethrough, said bores of said first set of bores being extended in a first direction, said bores of said second set of bores being extended in a second direction;

a plurality of elongate dowels, each dowel having opposite first and second ends, and a length defined between said first and second ends of said dowel;

each of said dowels being inserted through an associated bore of said pole;

said bottom end of said pole having a pair of diametrically opposed elongate slots;

an auger member having a top turning portion and a bottom corkscrew portion, said corkscrew portion being for insertion into a ground surface, said turning portion of said auger member having a generally T-shaped handle, said handle of said turning portion of said auger member having a pair of arms;

said turning portion of said auger member being inserted into said opening of said bottom of said pole, each of said arms of said handle of said turning portion of said auger member being inserted into an associated slot of said bottom end of said pole; and wherein each of said slots has a locking notch, wherein each of said arms of said handle of said turning portion of said auger member is inserted into an associated slot of said bottom end of said pole such that each of said arms of said handle may be inserted into the locking notch of the associated slot of said bottom end of said pole to help hold said handle of said auger member to said bottom end of said pole.

12. The vegetation support of claim 11, wherein said top has an opening into the interior of said pole, wherein a cap is inserted into said opening of said top end of said pole such that said cap substantially covers said opening of said top end of said pole.

13. The vegetation support of claim 11, wherein said bores are extended substantially perpendicular to said longitudinal axis of said pole, and wherein said bores of said first set of bores are extended substantially perpendicular to said bores of said second set of bores.

14. The vegetation support of claim 11, wherein said bores of said first set of bores are generally equidistantly spaced apart from the adjacent bores of said first set of bores.

15. The vegetation support of claim 11, wherein said bores of said second set of bores are generally equidistantly spaced apart from the adjacent bores of said second set of bores.

16. The vegetation support of claim 11, wherein said pole has a length defined between said top and bottom ends of said pole of less than about 6 feet, wherein said pole has a diameter of less than about 2 inches, wherein adjacent bores of said first set of bores are spaced apart less than about 12 inches from each other, wherein adjacent bores of said second set of bores are spaced apart less than about 12 inches from each other, and wherein each bore of said first set of bores is spaced apart from adjacent bores of said second set of bores less than about 6 inches.

17. The vegetation support of claim 11, wherein said length of each of said dowels is less than about 14 inches.

18. The vegetation support of claim 11, wherein said first end of each of said dowels is tapered.

19. The vegetation support of claim. 11, wherein each of said dowels has an annular stop therearound, said annular stop being positioned between said first and second ends of said dowel, wherein each of said dowels is inserted through an associated bore of said pole such that said annular stops of said dowels abut said pole.

* * * * *